US007671294B2

(12) United States Patent
Belashchenko et al.

(10) Patent No.: US 7,671,294 B2
(45) Date of Patent: Mar. 2, 2010

(54) PLASMA APPARATUS AND SYSTEM

(76) Inventors: Vladimir Belashchenko, 9 Irving Dr., Concord, NH (US) 03301; Oleg P. Solonenko, 33 Tereshkova Street, Apt. 31, Novosibirsk (RU) 630090; Andrey V. Smirnov, 17 Primorskaya Street, Apt. 12, Novosibirsk (RU) 630056

( * ) Notice: Subject to any disclaimer, the term of this patent is extended or adjusted under 35 U.S.C. 154(b) by 451 days.

(21) Appl. No.: 11/564,080

(22) Filed: Nov. 28, 2006

(65) Prior Publication Data

US 2008/0121624 A1 May 29, 2008

(51) Int. Cl.
*B23K 10/00* (2006.01)

(52) U.S. Cl. ................. 219/121.51; 219/75; 219/76.16; 219/121.47; 219/121.36

(58) Field of Classification Search ............ 219/121.51, 219/76.16
See application file for complete search history.

(56) References Cited

U.S. PATENT DOCUMENTS

| | | | | |
|---|---|---|---|---|
| 4,675,165 | A | 6/1987 | Kuckens | |
| 5,376,767 | A | 12/1994 | Heanley et al. | |
| 5,408,066 | A * | 4/1995 | Trapani et al. | 219/121.47 |
| 5,591,356 | A * | 1/1997 | Sakuragi et al. | 219/121.5 |
| 6,744,006 | B2 | 6/2004 | Johnson et al. | |
| 2003/0160033 | A1 | 8/2003 | Johnson | |
| 2005/0016968 | A1 * | 1/2005 | Faslivi et al. | 219/121.5 |
| 2005/0115932 | A1 * | 6/2005 | Deegan et al. | 219/121.52 |
| 2005/0258151 | A1 * | 11/2005 | Griffin | 219/121.52 |
| 2006/0091116 | A1 | 5/2006 | Suslov | |
| 2006/0108332 | A1 | 5/2006 | Belashchenko | |

FOREIGN PATENT DOCUMENTS

WO WO2004028221 * 4/2004

OTHER PUBLICATIONS

International Search Report and Written Opinion issued in International Patent Application No. PCT/US07/85606 dated Apr. 8, 2008.
International Search Report and Written Opinion issued in International Patent Application No. PCT/US2007/085591 dated May 13, 2008.

* cited by examiner

*Primary Examiner*—Tu B Hoang
*Assistant Examiner*—Brian Jennison
(74) *Attorney, Agent, or Firm*—Grossman, Tucker, Perreault & Pfleger, PLLC

(57) ABSTRACT

A twin plasma apparatus including an anode plasma head and a cathode plasma head. Each of the plasma heads includes an electrode and a plasma flow channel and a primary gas inlet between at least a portion of the electrode and the plasma flow channel. The anode plasma head and the cathode plasma head are oriented at an angled toward one another. At least one of the plasma flow channels includes three generally cylindrical portions. The three generally cylindrical portions of the plasma flow channels reduce the occurrence of side arcing.

20 Claims, 12 Drawing Sheets

PLASMA APPARATUS AND SYSTEM

FIELD

The present disclosure generally relates to plasma torches and plasma systems, and more particularly relates to twin plasma torches for plasma treatment and spraying of materials.

BACKGROUND

The efficiency and stability of plasma thermal systems for plasma treatment of materials and plasma spraying may be affected by a variety of parameters. Properly establishing a plasma jet and maintaining the operating parameters of the plasma jet may, for example, be influenced by the ability to form a stable arc having a consistent attachment to the electrodes. Similarly, the stability of the arc may also be a function of erosion of the electrodes and/or stability of plasma jet profiling or position. Changes of the profile and position of the plasma jet may result in changes in the characteristics of the plasma jet produced by the plasma torch. Additionally, the quality of a plasma treated material or a coating produced by a plasma system may be affected by such changes of plasma profiling, position and characteristics.

In a conventional twin plasma apparatus 100, as shown in FIG. 1, a cathode and an anode head 10, 20 are generally arranged at approximately a 90 degree angle to one another. A feeding tube 112, generally disposed between the heads, may supply a material to be treated by the plasma. The components are generally arranged to provide a confined processing zone 110 in which coupling of the arcs will occur. The relative close proximity to one another and the small space enclosed thereby, often creates a tendency for the arcs to destabilize, particularly at high voltages and/or at low plasma gas flow rate. The arc destabilization, often termed "side arcing" occurs when the arcs preferentially attach themselves to lower resistance paths. Attempts to prevent side arcing often involve the use of a shroud gases, however, this approach typically results in a more complicated design, as well as lower temperatures and enthalpies of the plasma. The lower plasma temperature and enthalpy consequently result in lower process efficiency.

BRIEF DESCRIPTION OF THE DRAWINGS

Features and advantages of the claimed subject matter will be apparent from the following description of embodiments consistent therewith, which description should be considered in conjunction with the accompanying drawings, wherein:

DESCRIPTION

As a general overview, the present disclosure may provide twin plasma torch systems, modules and elements of twin plasma torch systems, etc., which may, in various embodiments, exhibit one or more of; relatively wide operational window of plasma parameters, more stable and/or uniform plasma jet, and longer electrode life. Additionally, the present disclosure may provide tools that may control an injection of a material to be plasma treated or plasma sprayed into a plasma jet. Twin plasma apparatuses may find wide application in plasma treatment of materials, powder spheroidization, waste treatment, plasma spraying, etc., because of relatively high efficiency of such apparatuses.

A twin plasma apparatus consistent with the present disclosure may provide substantially higher efficiency of plasma treatment of materials. In part, the higher efficiency may be realized by plasma flow rates and velocities that are relatively low and related Reynolds numbers which may be about, or below, approximately 700-1000. Consistent with such plasma flow rates and velocities, the dwell time of materials in the plasma stream may be sufficient to permit efficient utilization of plasma energy and desirable transformation of materials during the plasma treatment may occur with high efficiency and production rate. Additionally, a twin plasma apparatus consistent with the present disclosure may also reduce, or eliminate, the occurrence of side arcing, which is conventionally related to high voltage and/or low Reynolds's numbers.

Figure 1:
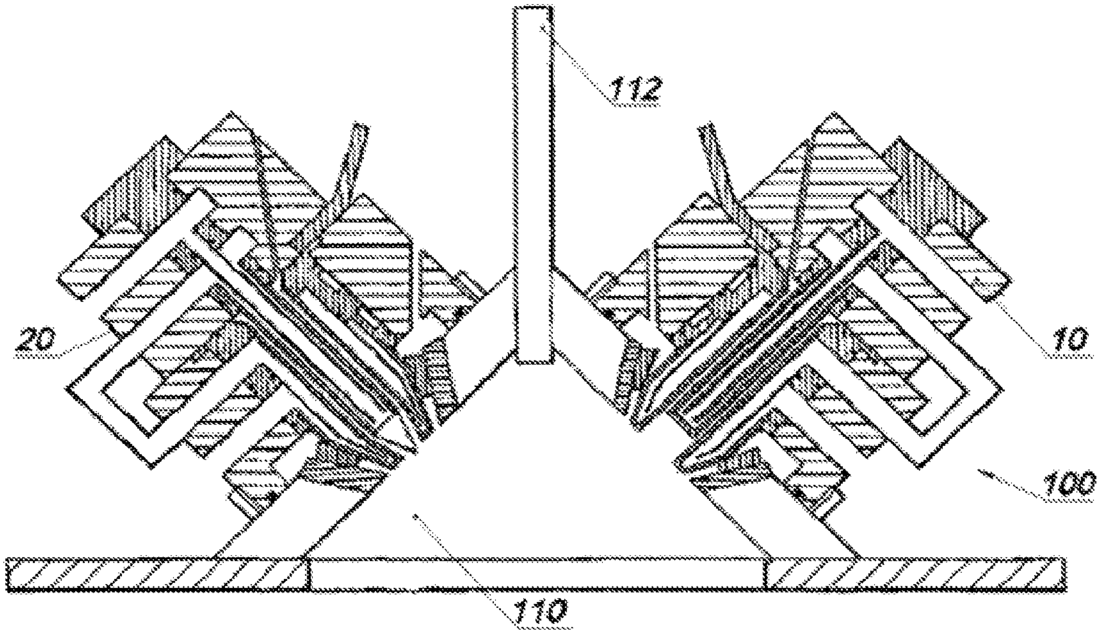
FIG. 1 is a detailed schematic view of an embodiment of a conventional angled twin plasma apparatus.
Figure 2:
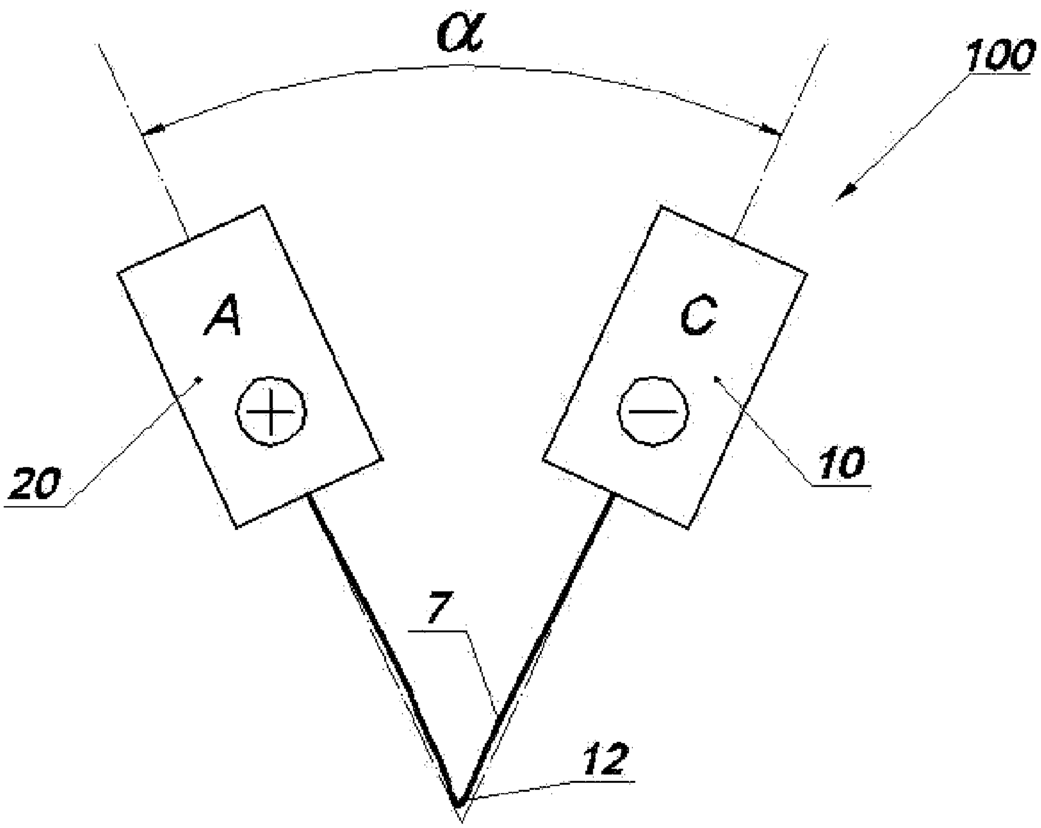
FIG. 2 is schematic illustrations of a twin plasma apparatus.

Referring to FIG. 2, a twin plasma apparatus 100 may generates arc 7 between the anode plasma head 20 and cathode plasma head 10 correspondingly connected to positive and negative terminals of a DC power source. As shown in FIG. 2 the axis of the plasma heads 10 and 20 may be arranged at an angle α to one another, with the convergence of the axes providing the coupling zone of the plasma heads 10, 20.

Figure 3A:
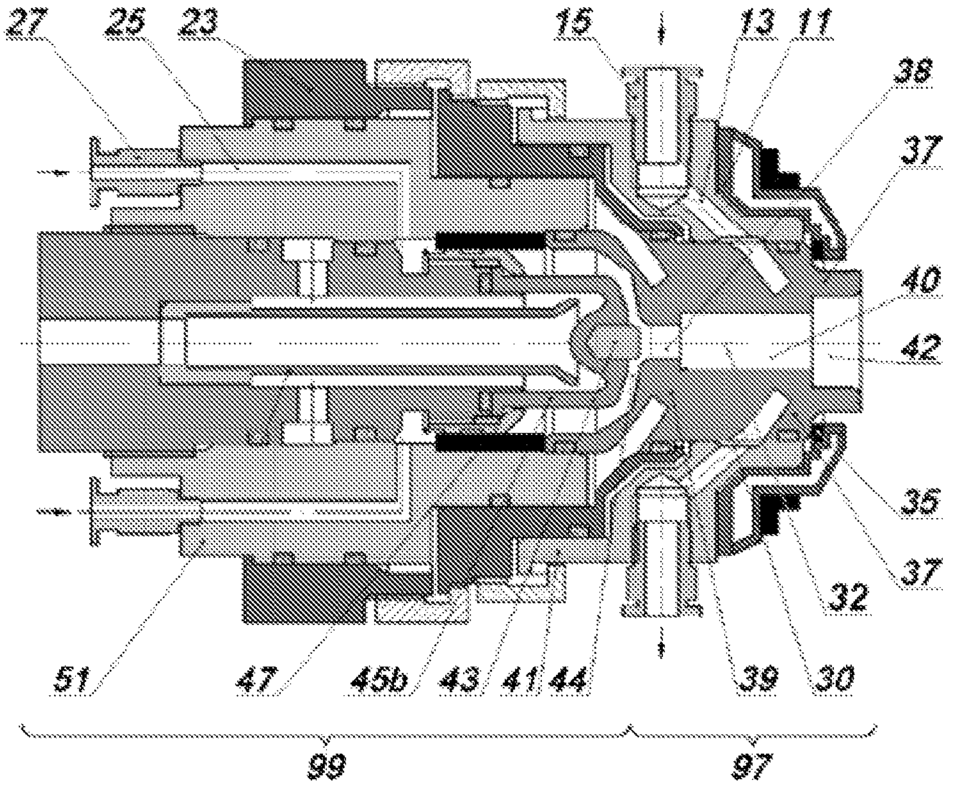
FIGS. 3*a-b* schematically depict embodiments of a cathode plasma head, and an anode plasma head, respectively, consistent with the present disclosure.
Figure 3B:
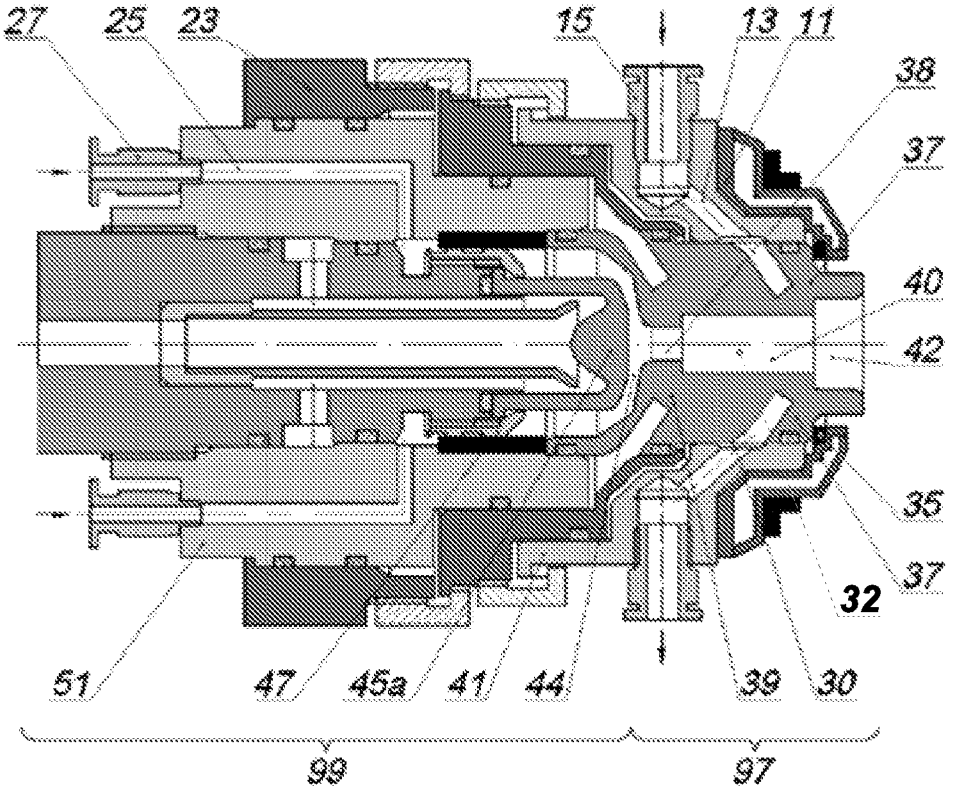

Referring first to FIG. 3, the present disclosure may generally provide a twin plasma apparatus including a cathode plasma head depicted at FIG. 3*a* and an anode plasma head depicted at FIG. 3*b*. As shown, the anode and cathode plasma heads may generally be of a similar design. The major difference between the anode and cathode plasma heads may be in the design of electrodes. For example, in a particular embodiment, an anode plasma head may include an anode 45*a*, which may be made of material with a relatively high conductivity. Exemplary anodes may include copper or copper alloy, with other suitable materials and configurations being readily understood. The cathode plasma head may include an insert 43 which is inserted into a cathode holder 45*b*. The cathode holder 45*b* may be made of material with high conductivity. Similar to the anode, the cathode holder 45*b* may be copper or copper alloy, etc. The material of insert 43 may be chosen to provide long life of the insert when used in connection with particular plasma gases. For example, Lanthaneited or Torirated Tungsten may be suitable materials for use when nitrogen or Argon are used as plasma gases, with or without additional Hydrogen or Helium. Similarly, Hafnium or Zirconium insert may be suitable materials in embodiments using air is as a plasma gas. In other embodiments, the anode may be of a similar design to cathode, and may contain Tungsten or Hafnium or other inserts which may increase stability of the arc and may prolong a life of the anode.

Plasma heads may be generally formed by an electrode module 99 and plasma forming assembly 97. An electrode module 99 may include primary elements such as an electrode housing 23, a primary plasma gas feeding channel 25 having inlet fitting 27, a swirl nut 47 forming a swirl component of a plasma gas, and a water cooled electrode 45*a* or 45*b*. Various additional and/or substitute components may be readily understood and advantageously employed in connection with an electrode module of the present disclosure.

The plasma forming assembly 97 may include main elements such as a housing 11, a forming module 30 having upstream section 39 and exit section 37, a cooling water channel 13 connected with water inlet 15, insulation ring 35. The forming module 30 may generally form a plasma channel 32.

In the illustrated exemplary plasma heads, primary plasma gas is fed through an inlet fitting 27 to channel 25 which is located in an insulator 51. Then the plasma gas is further directed through a set of slots or holes made in the swirl nut 47, and into a plasma channel 32 through a slot 44 between anode 45*a* or cathode holder 45*b*, with cathode 43 mounted therein, and upstream section 39 of the forming module 30. Various other configurations may alternatively, or additionally, be utilized for providing the primary plasma gas to the plasma channel 32.

The plasma channel 32 consistent with the present disclosure may uniquely facilitate the establishment and may maintain a controlled arc exhibiting reduced tendency, or no tendency, for side-arcing at relatively low primary plasma gas flow rates, e.g., which may exhibit Reynolds's number in the range of about 800 to 1000, and more particularly exhibit Reynolds's number in the range of below 700.

Figure 4:
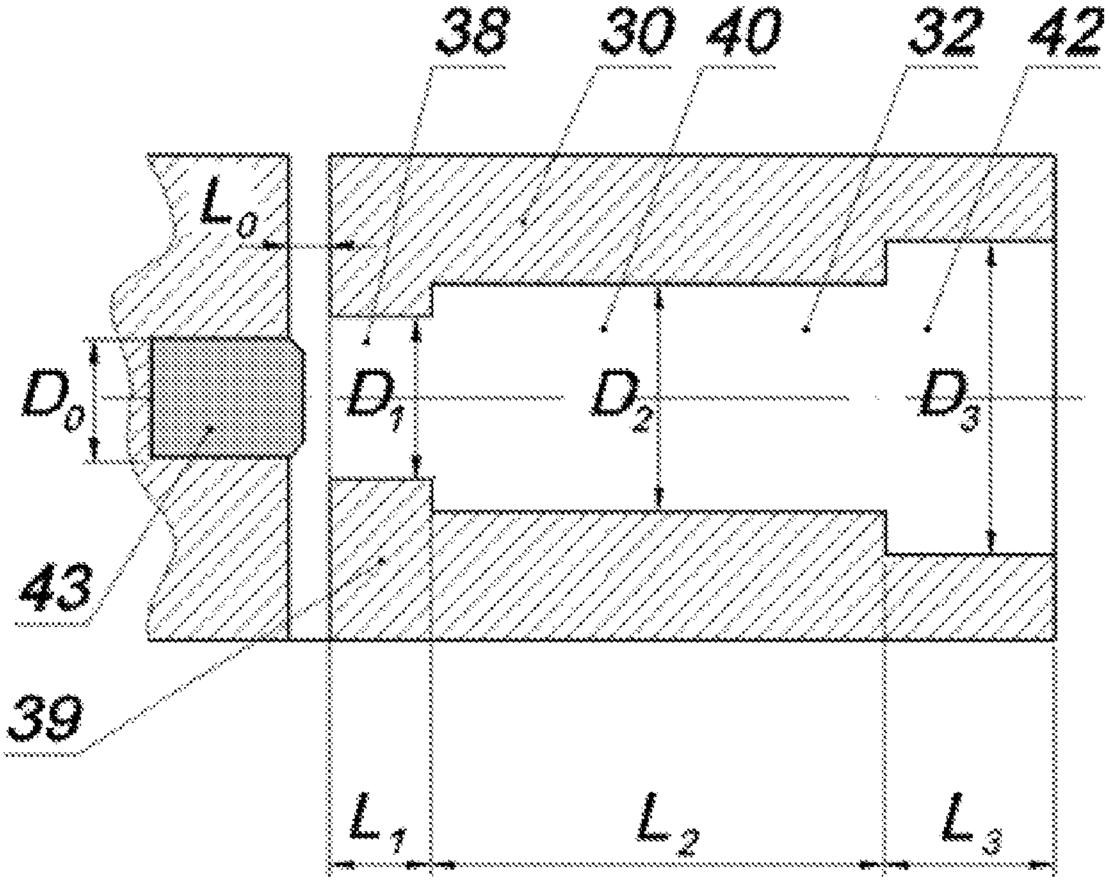
FIG. 4 is a detailed view of an embodiment of a plasma channel including three cylindrical portions with different diameters consistent with an aspect of the present disclosure.

The plasma channel 32 may include three generally cylindrical portions, as illustrates in more details in FIG. 4. The upstream portion 38 of the plasma channel 32 may be disposed adjacent to the electrodes, e.g. the cathode insert 43 and the anode 45*b*, and may have diameter D1 and length L1. The middle portion 40 of the plasma channel 32 may have diameter D2>D1 and length L2. The exit portion 42 of the plasma channel 32 may have diameter D3>D2 and length L3.

The upstream cylindrical portion 38 may generate optimized velocity of a plasma jet providing reliable expansion, or propagation, of the plasma jet to the coupling zone 12 depicted on FIG. 2. The diameter D1 may be greater than a diameter of a cathode D0. Generally, optimum value of the diameter D1 depends on plasma gas flow rate and arc current. For example, in one embodiment D1 may generally be in the range of between about 4.5-5.5 mm if Nitrogen is used as a plasma gas, with a plasma gas flow rate in the range of between about 0.3-0.6 gram/sec and an arc current in the range of between about 200-400 A. The diameter D1 of the first portion may generally be increased in embodiments utilizing a higher plasma gas flow rate and/or higher arc current.

Length (L1) of the first portion may generally be selected long enough to allow a stable plasma jet to be formed. However, a rising probability of side arcing inside the first portion may be experienced at L1>2 D1. Experimentally, a desirable value of a ratio L1/D1 may be described as follows.

$$0.5<L1/D1<2 \quad (1)$$

More preferable ratio between L1 and D1 may be described as follows.

$$0.5<L1/D1<1.5 \quad (1a)$$

The second 40 and third 42 portions of the plasma channel 32 may allow for increasing the level of the plasma gas ionization inside the channel, as well as for further forming of a plasma jet providing desirable velocity. The diameters of said second 40 and third 42 portions of the plasma channel 32 may generally be characterized by the relationship of D3>D2>D1. The foregoing relationship of the diameters may aid in avoiding further side arcing inside said second 40 and third 42 portions of the plasma channel 32, as well as decreasing the operating voltage.

The additional characteristics of the second portion may be described as follows.

$$4\text{ mm}>D2-D1>2\text{ mm} \quad (2)$$

$$2>D2/D1>1.2 \quad (3)$$

The additional characteristics of the third portion may be described as follows.

$$6\text{ mm}>D3-D2>3.5\text{ mm} \quad (4)$$

$$2>L3/(D3-D2)>1 \quad (5)$$

Various modifications and variations to the forging geometries given by the above relationships and characteristics may also, in some embodiments, provide desirable performance. In the illustrated embodiments of FIGS. 3 and 4, the plasma channel 32 exhibits a stepped profile between the three generally cylindrical portions. In addition to the stepped configuration, various different options regarding geometries of the plasma channel connecting the three cylindrical portions may also be suitably employed. For example, conical or similar transitions between the cylindrical portions, as well as rounded edges of the steps, may be also used for the same purpose.

A twin plasma apparatus having plasma channels consistent with relationships (1)-(5), above, may provide a stable operation with reduce, or eliminated, side arcing across a relatively wide range of operating parameters. However, in some instances "side arcing" may still occur when plasma gas flow rate and plasma velocity are further reduced. For example, an exemplary embodiment of a twin plasma torch with a plasma channel having dimensions D1=5 mm, L1=3 mm, D2=8 mm, L2=15 mm, D3=13 mm, L3=6 mm may operate without "side arcing" at arc current 150-350 Amperes using nitrogen as the primary plasma gas and provided at a flow rate above 0.35 grams/sec. Decreasing the nitrogen flow rate below 0.35 g/sec and, especially, below 0.3 g/sec may result in the "side arcing". In accordance with present disclosure, further decreasing the plasma gases flow rate may be accomplished, while still minimizing or preventing side arcing, by implementing electrically insulated elements in the construction of the forming module 30.

Figure 5:
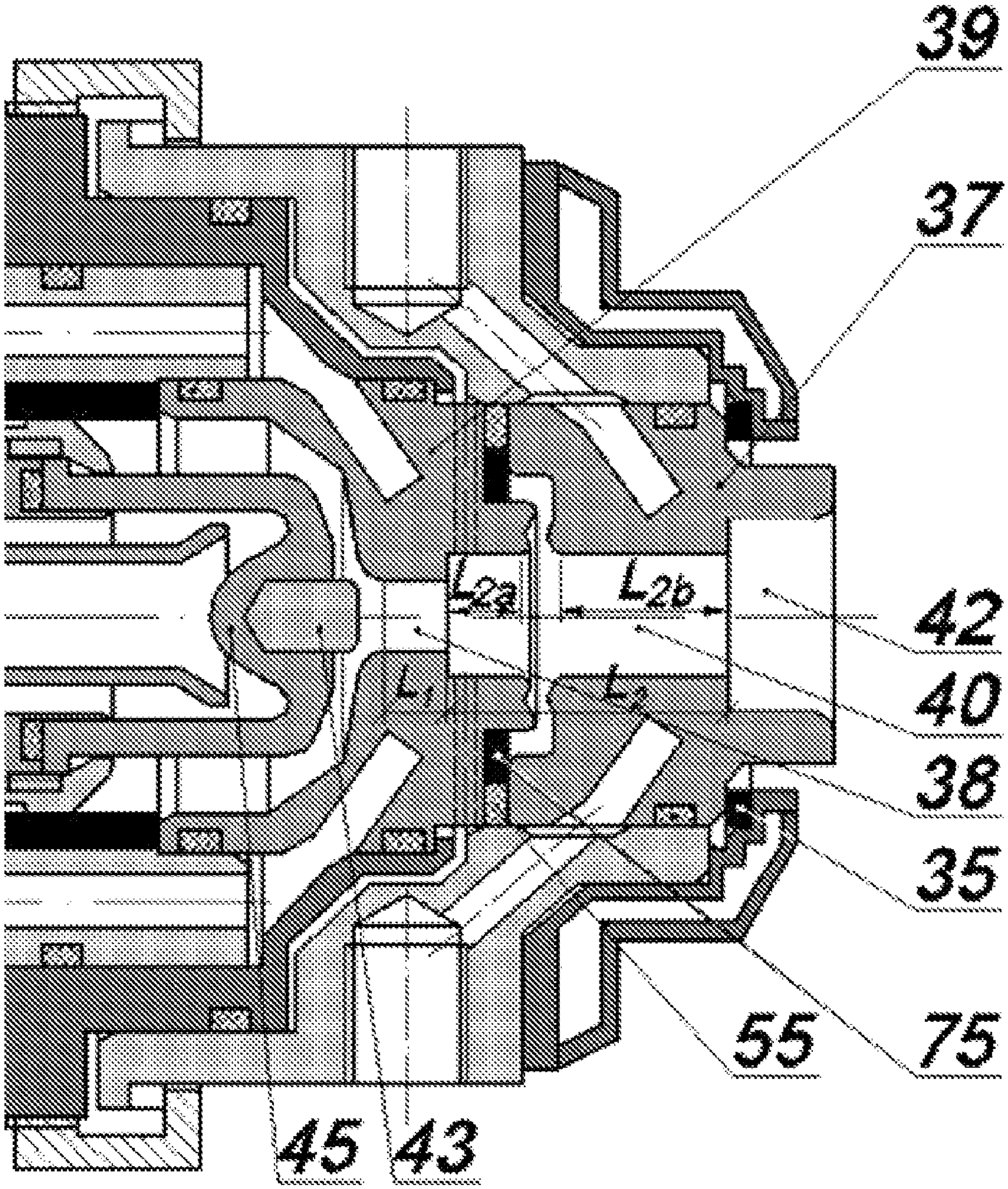
FIG. 5 is a detailed schematic view of an embodiment of a forming module consistent with the present disclosure having upstream and downstream portions of a forming module.

Referring also to FIG. 5, there is illustration an embodiment of a forming module 30 in which an upstream portion 39 of a forming module 30 is electrically insulated from the downstream portion 37 of the forming module by a ceramic insulating ring 75. In this illustrated embodiment, a sealing O-ring 55 may be used in conjunction with the insulating ring 75. Electrical insulation of upstream part 39 and downstream part 37 of the forming module 30 may result in additional stability of the arc and plasma jet, i.e., provide a plasma jet exhibiting reduced or eliminated side arcing, even for very low flow rates of a plasma gas, and the related low values of the Reynolds number. For example, during testing of an exemplary embodiment of a plasma head having the same dimensions of the plasma channel and operating at the same level of current as in the exemplary embodiment described above, when the nitrogen flow rate was decreased down to 0.25 g/sec, side arcing was not observed. Additional electrical insulation of the elements of the forming module 30 may be required to permit even further reductions in the plasma gas flow rate while minimizing or eliminating side arcing. Such addition insulation may correspondingly increase the complexity of a twin plasma apparatus.

Figure 6:
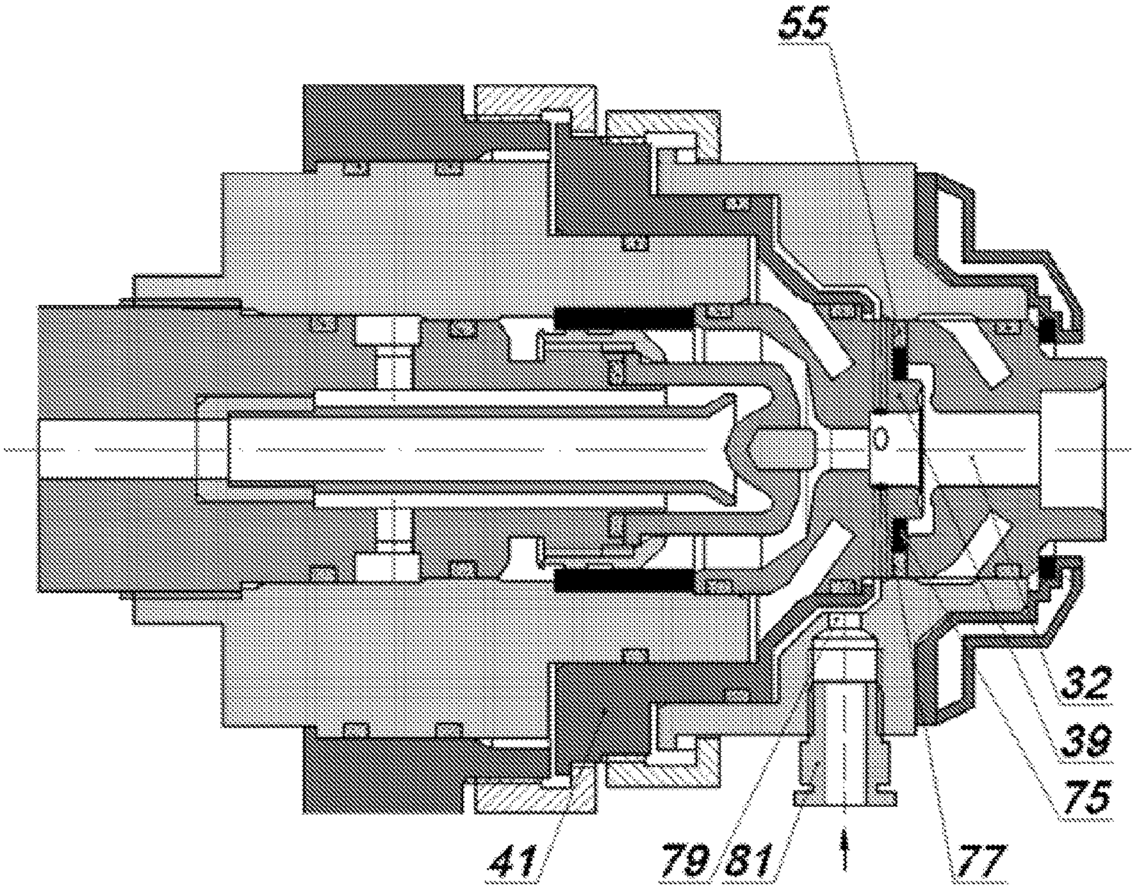
FIG. 6 illustrates an embodiment configured to deliver a secondary plasma gas to the plasma channel.
Figure 7A:
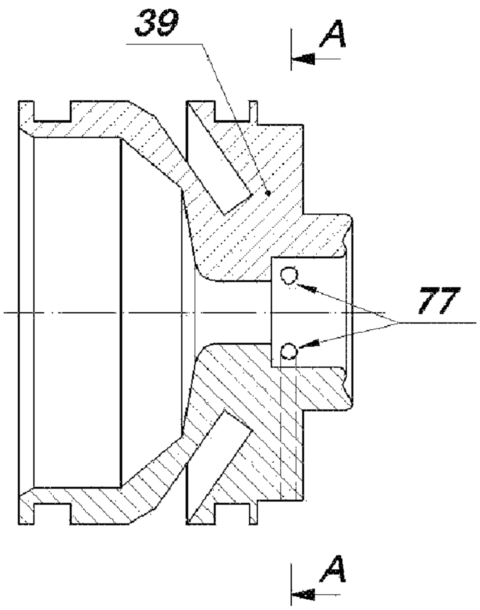
FIGS. 7*a-b* depict axial and radial cross-sectional and sectional views of an arrangement for injection of a secondary plasma gas consistent with the present disclosure.
Figure 7B:
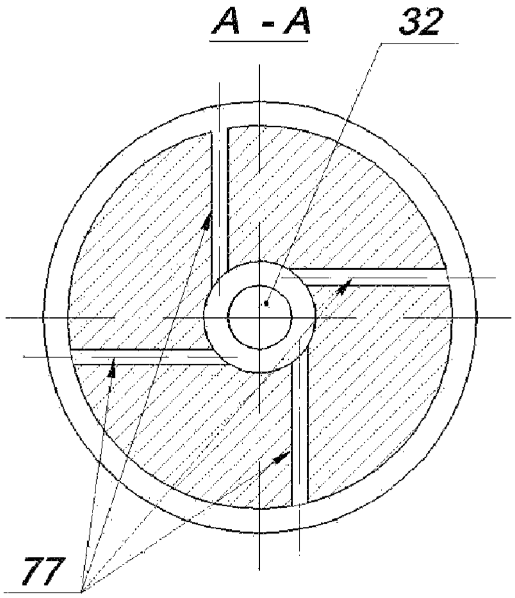

FIGS. 3*a-b* illustrate an embodiment of a twin plasma apparatus in which a plasma gas, or mixture of plasma gases, is supplied only through a gas feeding channel 27 and swirl nut 47. In some instance, supplying the plasma gas around the electrodes may cause an excessive erosion of electrodes, especially if plasma gas mixture includes air, or another active gas. According to an aspect of the present disclosure, erosion of the electrodes may be reduced, or prevented, by supplying an inert gas, for example argon, through swirl nut 47, as described above, and passing around the electrodes. An active, or additional secondary gas or gas mixture, may be fed separately downstream of the slot 44, which is between anode 45*a* or cathode 43 and upstream section 39 of the forming module 30. An embodiment providing a secondary introduction of a plasma gas is shown in FIG. 6 for a cathode plasma head. A corresponding structure for an anode plasma head will be readily understood. The secondary plasma gas may be supplied to a gas channel 79 through a gas inlet 81 located inside a distributor 41. From the channel 79 the secondary gas may be fed to a plasma channel 32 through slots or holes 77 located in the upstream section 39 of the forming module 30. Referring also to FIG. 7, an exemplary embodiment of one possible feature for secondary plasma gas feeding is shown in axial and radial cross-sections. In the illustrated embodiment, four slots 77 may be provided in the upstream section 39 to supply the secondary plasma gas to the plasma channel 32. As shown, the slots 77 may be arranged to provide substantially tangential introduction of the secondary plasma gas to plasma channel 32. Other arrangements may also suitably be employed.

There may be a variety of possible arrangements implementing one, or several, twin plasma apparatuses in accordance with present disclosure to satisfy different technological requirements dealing with plasma treatment of materials and plasma spraying. Axial, radial and combined axial/radial injection of materials to be plasma treated may be utilized in these arrangements. FIGS. 8-11 illustrate exemplary configurations for the injection of material in conjunction with a twin plasma apparatus. Various other configurations may also suitably be employed.

FIGS. 8 and 9 illustrate injection configurations implemented in combination with a single twin plasma torch, respectively providing axial and radial feeding of materials to be treated. Angle $\alpha$ between cathode head 10 and anode head 20 may be one of the major parameters determining a position of a coupling zone, length of the arc and, consequently, operating voltage of the arc. Smaller angles $\alpha$ may generally result in longer arc and higher operating voltage. Experimental data indicates that for efficient plasma spheroidization of ceramic powders angle $\alpha$ within 45-80 degrees may be advantageously employed, with an angle in the range of between about $50° < \alpha < 60°$ being particularly advantageous.

Figure 8A:
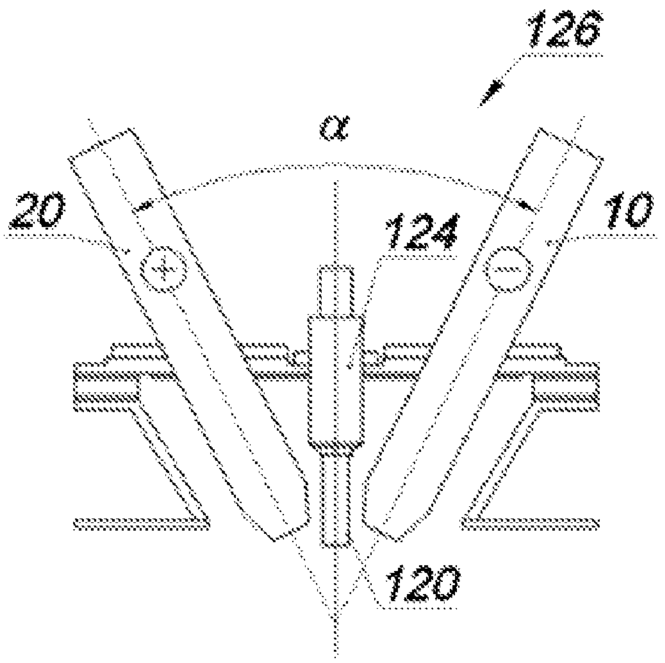
FIGS. 8*a-b* illustrate views of a single twin plasma torch configured for axial injection of materials.
Figure 8B:
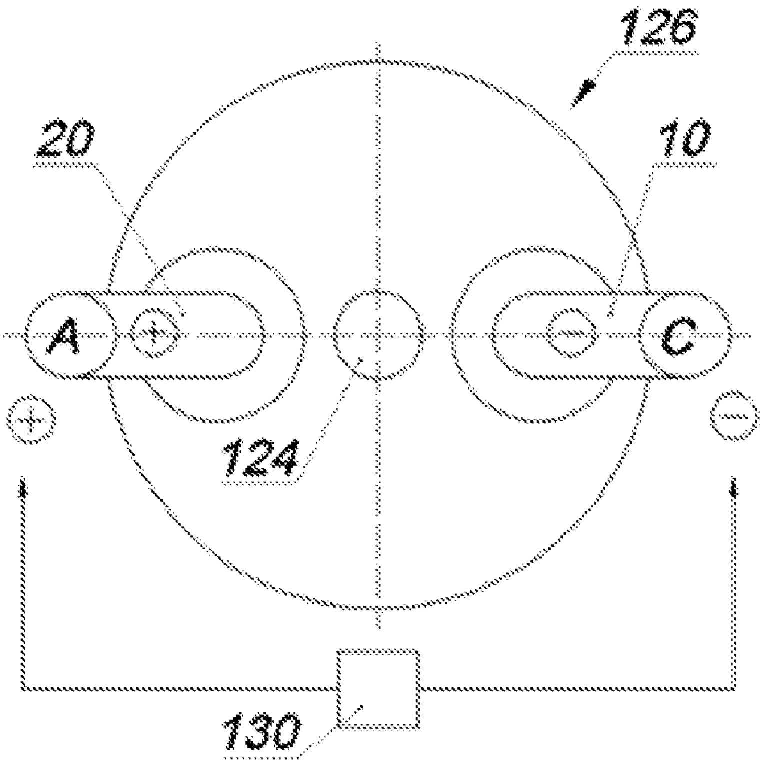

FIGS. 8*a*-8*b* illustrate cathode 10 and anode 20 plasma heads oriented to provide a single angled twin plasma torch system 126. The plasma heads 10, 20 may be powered by a power supply 130. An axial powder injector 120 may be disposed between the respective plasma heads 10, 20 and may be oriented to direct an injected material generally toward the coupling zone. The axial powder injector 120 may be supported relative to the plasma heads 10, 20 by an injector holder 124. In various embodiments, the injector holder may electrically and/or thermally insulate the injector 120 from the plasma torch system 126.

Figure 9A:
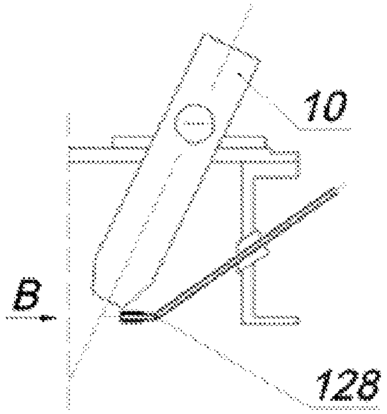
FIGS. 9*a-c* illustrate a single twin plasma torch configured for radial injection of materials.
Figure 9B:
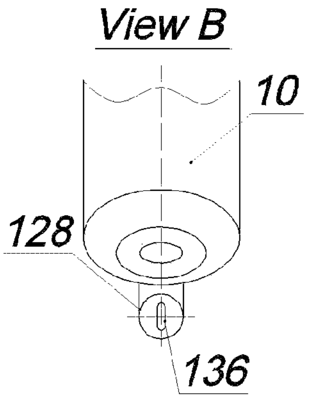
Figure 9C:
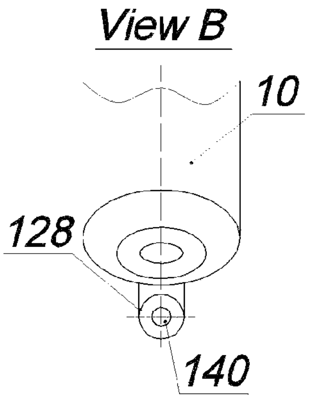

A plasma torch configuration providing radial feeding of materials is illustrated in FIG. 9*a-c*. As shown, a radial injection 128 may be disposed adjacent to the end of one or both of the plasma heads, e.g., cathode plasma head 10. The radial injection 128 may be oriented to inject material into the plasma stream emitted from the plasma head in a generally radial direction. A radial injector 128 may have a circular cross-section of the material feeding channel 140, as shown in FIG. 9*c*. In other embodiments, however, an elliptical or similar shape of the channel 136, oriented with the longer axis oriented along the axis of the plasma stream from the plasma head as shown in FIG. 9*b*, may result in improved utilization of plasma energy and, consequently, in higher production rate.

Figure 10:
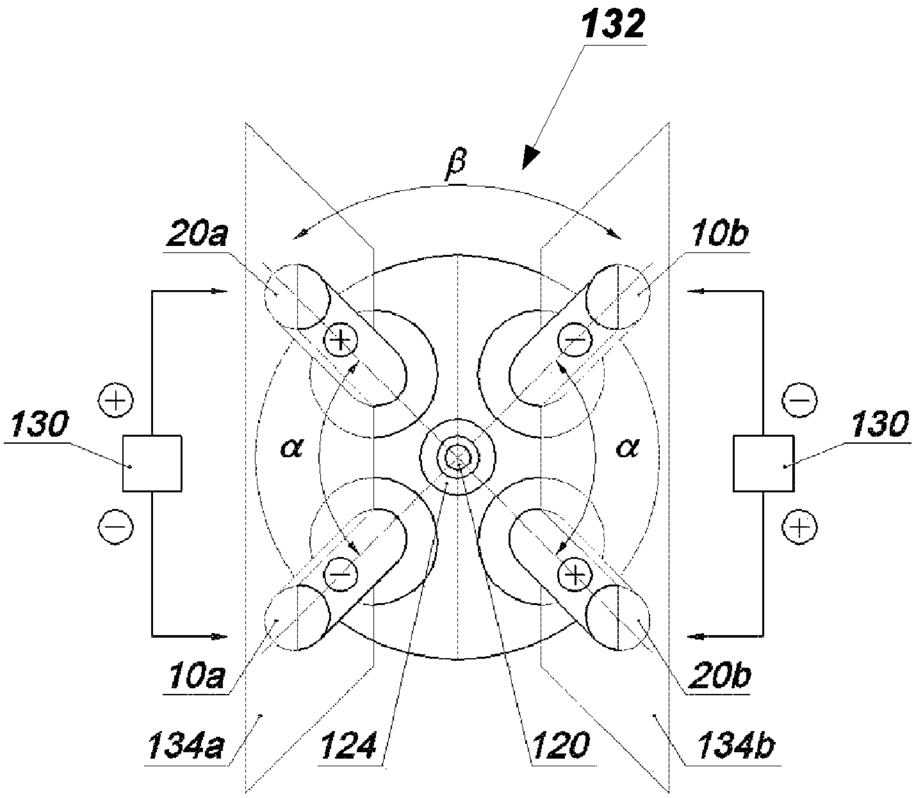
FIG. 10 is a schematic of a plasma torch assembly including two twin plasma torches.
Figure 11A:
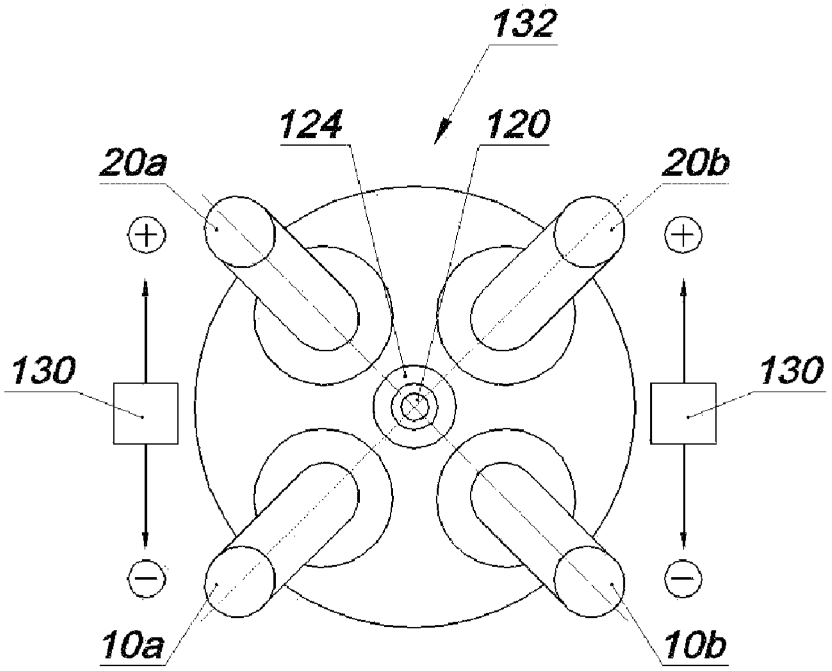
FIGS. 11*a-b* are top and bottom illustrations of a plasma torch assembly including two twin plasma torches configured for axial injection of materials.

FIGS. 10-11 illustrate possible arrangements of a two twin plasma torch assembly 132. The axis of each pair of cathode plasma head 10*a*, 10*b* and the corresponding anode plasma head 20*a*, 20*b* may lie in a respective plane 134*a*, 134*b*. The planes 134*a* and 134*b* may form angle $\beta$ between each other. Some experimental results have indicated that an angle $\beta$ between about 50-90 degrees, and more particularly in the range of between about $55° < \beta < 65°$ may provide efficient plasma spheroidization of ceramic powders. Side arcing may begin to occur as the angle $\beta$ between the planes 134*a*, 134*b* is decreased below about 50 degrees. Angles $\beta$ greater than about 80-90 degrees may result in some disadvantages for the axial powder injection.

Figure 11B:
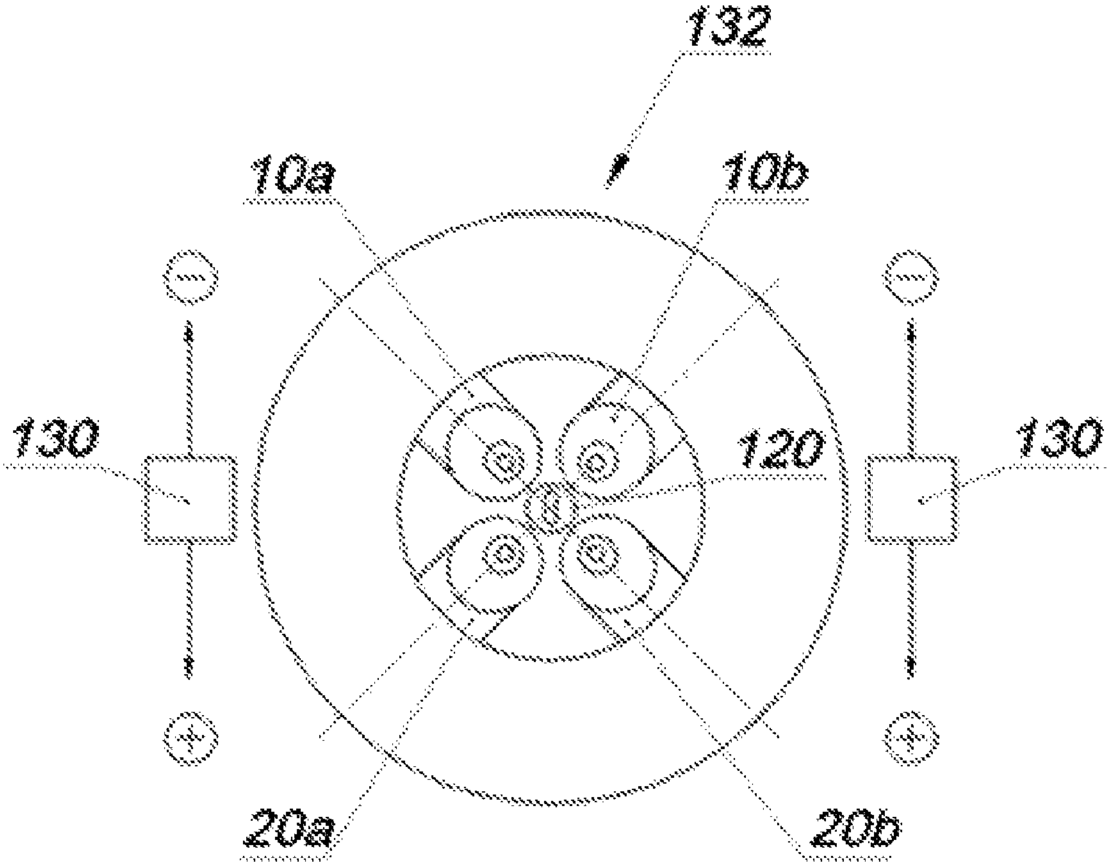

As discussed above, configurations for axial feeding of materials are illustrated in FIGS. 8 and 11. Powder injector 120 may be installed in the injector holder 124 to provide adjustability of the position of the injector 120 to suit various processing requirements. While not shown, radial material injectors, such as depicted in FIGS. 9*a-c*, may similarly be adjustably mounted relative to the plasma heads, e.g., to allow the spacing between the injector and the plasma stream to adjusted as well as allowing adjustment of the injection point along the plasma stream. An axial injector 120 may have a circular cross-section 140 of the material feeding channel. However, similar to radial injection, elliptical or similar shaped injector channel may be employed, e.g., with the longer axis of the opening oriented as shown of FIG. 11*b*. Such a configuration may result in improved utilization of plasma energy, which may, in turn, result in higher production rate. In other embodiments, improved utilization of the plasma energy may be achieved through the used of combined, simultaneous radial and axial injection of materials to be plasma treated. A variety of injection options will be understood, which may allow adjustments and optimization of the plasma and injection parameters for specific applications.

While custom developed power sources may suitably be employed in connection with a plasma system according to the present disclosure, it will be appreciated that the operating voltage of a plasma system may be controlled and adjusted to accommodate the available output parameters of commercial available power sources. For example, ESAB (Florence, S.C., USA) manufactures power sources ESP-400, and ESP-600 which are widely used for plasma cutting and other plasma technologies. These commercially available power sources may be efficiently used for twin plasma apparatuses and systems as well. However, maximum operating voltage of this family of plasma power sources at 100% duty cycle is about 260-290 volts. Thus, the design of a twin plasma apparatus, the plasma gas type, and the flow rate of the plasma gas may be adjusted to fit available voltage of ESP type of power sources. Similar adjustments may be carried out for mating a twin plasma apparatus to other commercially available, or custom manufactured, power supply.

Figure 12A:
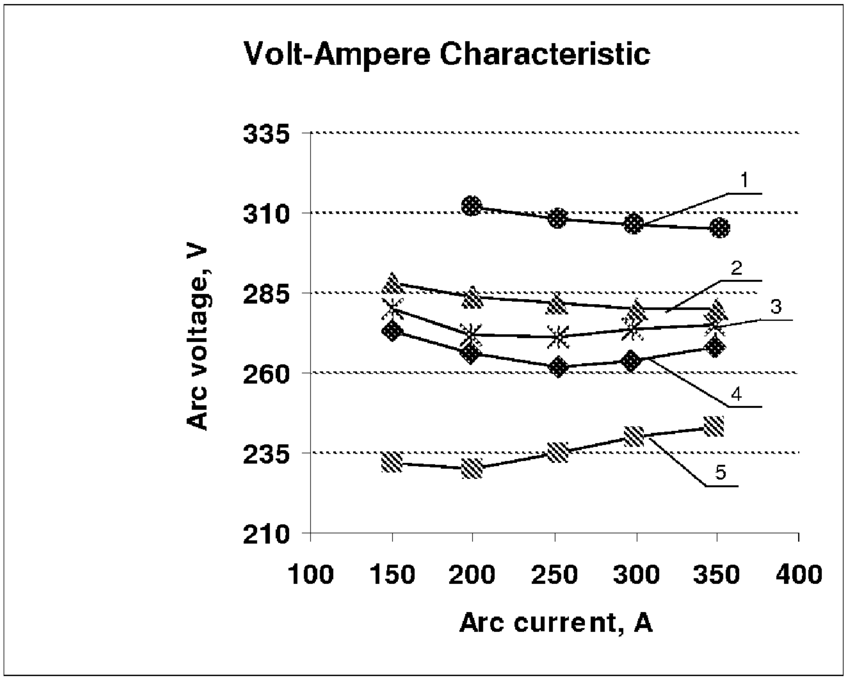
FIGS. 12*a-b* illustrate influence of plasma gases flow rates and current on the arc voltage for torches positioned at 50° angle.
Figure 12B:
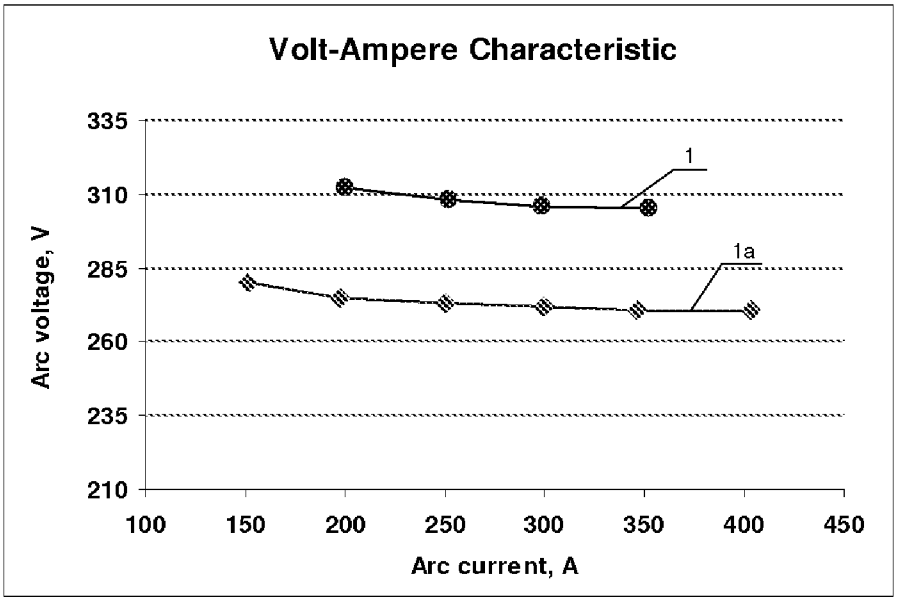

FIGS. 12*a*-*b* illustrate influence of the plasma channel dimensions, plasma gases flow rates and current on the arc voltage for exemplary embodiments of twin plasma torches provided with a 50° angle between respective cathode and anode plasma heads. Nitrogen may often be an attractive plasma gas for applications because of its high enthalpy, inexpensiveness and availability. However, application of the only nitrogen as a plasma gas may require high operating voltage of about 310 volts as illustrates by curve 1 on FIGS. 12*a*-*b*. Decreasing of the operating voltage, e.g., to within a voltage output range delivered from commercial available plasma power sources, may be achieved by using, for example, a mixture of argon and nitrogen with the optimized flow rates which is illustrated by curves 2-5 on FIG. 12*a*. Decreasing of the operating voltage may be also achieved by optimization of the plasma channel 32 profile and dimensions. The data presented in FIG. 12*a* was obtained using a twin plasma torch in which the plasma channel 32 of each plasma head had a profile define by D1=4 mm, D2=7 mm, and D3=11. The plasma gasses and flow rates associated with each of the curves 1-5 were, respectively, as follows: curve 1 and 1*a*: $N_2$, 0.35 g/sec; curve 2: Ar, 0.35 g/sec, $N_2$, 0.2g/sec; curve 3: $N_2$, 0.25 g/sec; curve 4: Ar, 0.5 g/sec, $N_2$, 0.15 g/sec, and curve 5: Ar, 0.5g/sec, $N_2$, 0.05 g/sec. FIG. 12*b* shows that even relatively insignificant increasing of diameters D1, D2, D3 from correspondingly 4 mm, 7 mm, and 11 mm to 5 mm, 8 mm, and 12 mm may result in the operating voltage decreasing from about 310 volts to approximately 270-280 volts which is illustrated by FIG. 12*b*.

Various features and advantages of the invention have been set forth by the description of exemplary embodiments consistent with the invention. It should be appreciated that numerous modifications and variation of the described embodiments may be made without materially departing from the invention herein. Accordingly, the invention should not be limited to the described embodiments, but should be afforded the full scope of the claims appended hereto.

What is claimed is:

1. A twin plasma apparatus comprising:

two plasma heads, each comprising an electrode, one comprising an anode and defining an anode plasma head and one comprising a cathode and defining a cathode plasma head, wherein said plasma heads are capable of generating an arc between said cathode and anode, each of said plasma heads comprising a plasma flow channel to thereby define first and second flow channels and a primary gas inlet disposed between at least a portion of said electrode and said plasma flow channels, said cathode plasma head and said anode plasma head being oriented at an angle toward one another; and each of said plasma flow channels comprises a first generally cylindrical portion adjacent to said electrode and having a diameter D1, a second generally cylindrical portion, adjacent to said first portion, having a diameter D2, and a third generally cylindrical portion, adjacent to said second portion, having a diameter D3 , wherein $D1<D2<D3$;

wherein said arc that is generated between said cathode plasma head and said anode plasma head is such that the arc passes sequentially from D1, D2 and D3 of said first flow channel and sequentially to D3, D2 and D1 of said second flow channel.

2. The twin plasma apparatus according to claim 1, wherein said first portion of said at least one flow channel comprises a length L1, and wherein $0.5<L1/D1<2$.

3. The twin plasma apparatus according to claim 1, wherein said first portion of said at least one plasma flow channel comprises a length L, and wherein $0.5<L1/D1<1.5$.

4. The twin plasma apparatus according to claim 1, wherein the first and second portions of the at least one plasma flow channel exhibit the relationship $2>D2/D1>1.2$.

5. The twin plasma apparatus according to claim 1, wherein the third portion of the at least one plasma flow channel comprises a length L3, and wherein $2>L3/(D3-D2)>1$.

6. The twin plasma apparatus according to claim 1, wherein a transition between said first portion and said second portion of the at least one plasma flow channel comprises a step.

7. The twin plasma apparatus according to claim 1, wherein at least one plasma head comprises an upstream portion and a downstream portion, said upstream portion comprising at least said first portion of said plasma flow channel and said downstream portion comprising at least said third portion of said plasma flow channel, and wherein said upstream portion is electrically insulated from said downstream portion.

8. The twin plasma apparatus according to claim 7, wherein said upstream portion of said plasma head comprises at least a portion of said second portion of said plasma flow channel, and said downstream portion of said plasma head comprises at least another portion of said second portion of said plasma flow channel.

9. The twin plasma apparatus according to claim 1, further comprising a secondary gas inlet disposed downstream of said first generally cylindrical portion of said at least one plasma flow channel.

10. The twin plasma apparatus according to claim 1, further comprising a powder injector configured to introduce a powder material into a plasma stream created by said anode and cathode plasma heads.

11. The twin plasma apparatus according to claim 1, wherein the angle between said anode plasma head and said cathode plasma head is between about 45 to about 80 degrees.

12. The twin plasma apparatus according to claim 11, wherein the angle between said anode plasma head and said cathode plasma head is between about 50 to about 60 degrees.

13. A plasma apparatus comprising:

a first anode plasma head having a plasma flow channel and a first cathode plasma head having a plasma flow channel each comprising an electrode, and a primary gas inlet disposed between at least a portion of each of said electrodes and said plasma flow channels, each of said plasma flow channels comprising a first generally cylindrical portion adjacent to said electrode having a diameter D1, a second generally cylindrical portion adjacent to said first portion having a diameter D2 and a third generally cylindrical portion adjacent to said second portion having a diameter D3, wherein $D1<D2<D3$;

said first anode plasma head and said first cathode plasma head being disposed at angle relative to one another and are capable of generating an arc between said first anode and first cathode plasma heads wherein said arc that is generated between said first anode plasma head and said first cathode plasma head is such that the arc passes sequentially from D1, D2 and D3 of one of said plasma flow channels and sequentially to D3, D2 and D1 of another of said plasma flow channels;

a second anode plasma head having a plasma flow channel and a second cathode plasma head having a plasma flow channel each comprising an electrode and a primary gas inlet disposed between at least a portion of each of said electrodes and said plasma flow channels, each of said plasma flow channels comprising a first generally cylindrical portion adjacent to said electrode having a diameter D1, a second generally cylindrical portion adjacent to said first portion having a diameter D2 and a third generally cylindrical portion adjacent to said second portion having a diameter D3, wherein D1<D2<D3;

said second anode plasma head and said second cathode plasma head being disposed at an angle relative to one another and are capable of generating an arc between said first anode and first cathode plasma heads wherein said arc that is generated between said second anode plasma head and said second cathode plasma head is such that the arc passes sequentially from D1, D2 and D3 of one of said plasma flow channels and sequentially to D3, D2 and D1 of another of said plasma flow channels;

said first anode plasma head and first cathode plasma head being disposed in a first plane and said second anode plasma head and said second cathode plasma head being disposed in a second plane, said first and second planes being disposed at an angle of between about 50 to about 90 degrees to one another.

14. A plasma apparatus according to claim 13, wherein said first plane and said second plane are disposed at an angle of between about 55 to about 65 degrees to one another.

15. A plasma apparatus according to claim 13, further comprising a powder injector associated with at least one plasma head, said injector configured to introduce a powdered material into a stream of plasma generated by said at least one plasma head.

16. A plasma apparatus according to claim 15, wherein said powder injector is configured to inject powder generally radially relative to said stream of plasma, and wherein said powder injector comprises an elongate opening cross-section, a long axis of said opening oriented generally parallel to an axis of said plasma flow channel of said at least one plasma head.

17. A plasma apparatus according to claim 15, wherein said powder injector is configured to direct a powder material toward a region located between a coupling zone of said first anode plasma head and said first cathode plasma head and a coupling zone of said second anode plasma head and said second cathode plasma head.

18. A plasma apparatus according to claim 15, comprising a first powder injector configured to inject powder generally radially relative to said stream of plasma, and a second powder injector configured to direct powder material toward a region located between a coupling zone of said first anode plasma head and said first cathode plasma head and a coupling zone of said second anode plasma head and said second cathode plasma head.

19. A plasma apparatus according to claim 13, wherein at least one of said plasma heads comprises a secondary gas inlet down stream from said primary gas inlet.

20. The twin plasma apparatus according to claim 1, wherein a transition between said second portion and said third portions of the at least one plasma flow channel comprises a step.

* * * * *